Patented Feb. 12, 1952

2,585,826

UNITED STATES PATENT OFFICE 2,585,826

CARBAMATE-QUATERNARY AMMONIUM COMPOUNDS AND THEIR PREPARATION

Robert T. Olsen, Belvidere, N. J., assignor to General Aniline & Film Corporation, New York, N. Y., a corporation of Delaware No Drawing. Application November 5, 1948, Serial No. 58,612

4 Claims. (Cl. 260—247.2)

The present invention relates to carbamate-quaternary ammonium compounds having a wide field of commercial application.

The literature is rife with disclosures of compounds having surface activity and possessing as a hydrophilic group an hydroxyalkyl or hydroxypolyalkoxyalkyl group. Examples of such compounds are, for instance, those described in U. S. P. 1,970,578.

I have now discovered that compounds which not only possess surface activity but which in addition have biocidal properties are those in which a carbamyl group is linked to a quaternary ammonium group through an alkyl ether linkage. Such compounds are prepared in extremely high yields by quaternizing an aminoalkyl carbamate resulting from the addition of an isocyanate to an hydroxyalkylamine.

Such compounds and their method of preparation as well as their use as surface active agents and biocides constitute the purposes and objects of the present invention.

Compounds embraced by the present invention, and which are characterized as carbamate-quaternary ammonium compounds, may be depicted by the following formulae:

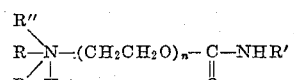

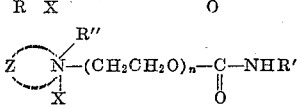

and

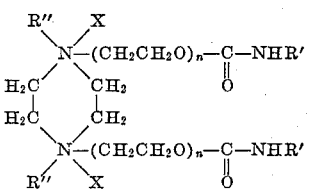

wherein R is β-hydroxyalkyl or hydroxypolyalkoxyalkyl, R' is alkyl or aryl, R" is β-hydroxyalkyl, hydroxyalkoxyalkyl, or hydroxypolyalkoxyalkyl, n is a whole number of at least 1, X is an anion such as chloride, bromide, iodide or the like, and Z represents the atoms necessary to complete a saturated 5- or 6-membered heterocyclic nitrogenous ring system.

These compounds are prepared by refluxing a glycol halide as the quaternizing agent with an aminoalkyl carbamate of the following formula:

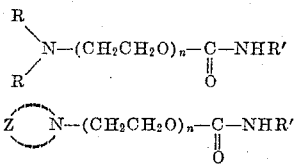

or

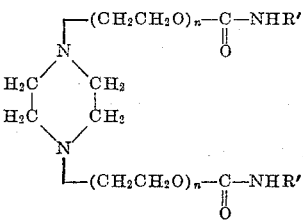

wherein R, R', n and Z have the same values as those given above.

Usually the glycol halide is employed in molar excess over the quantity of the carbamate subjected to the quaternizing reaction. Quantities of the components ranging from 1 mol of the carbamate to 4 to 7 mols of the glycol halide yield satisfactory results.

The reaction may be assumed to take place according to the following equation:

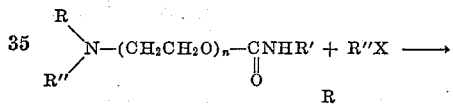

wherein R, R', R", n and X have the values given above.

Examples of aminoalkyl carbamates which are to be quaternized according to the present procedure are the ester of triethanolamine with octadecyl isocyanate, the ester of N-β-hydroxyethyl morpholine and octadecyl isocyanate, the ester of triethanolamine and phenyl isocyanate, the ester of N-β-hydroxyethyl piperazine and dodecyl isocyanate, the ester of N-β-hydroxyethyl pyrrolidine and butyl isocyanate, the ester of N-β-hydroxyethyl tetrahydroquinoline and octadecyl isocyanate, the ester of α-naphthyl isocyanate and the addition product of ammonia with 20 mols of ethylene oxide, the ester of octyl isocyanate and the addition product of pyrrolidine with 15 mols of ethylene oxide, the di-ester of dodecyl isocyanate and the addition product of piperazine with 25 mols of ethylene oxide, and the like. The addition products of the aforesaid amines and ethylene oxide are readily prepared according to the methods described in U. S. P. 1,970,578. Conversely, the esters may be readily produced by the method described in my copending application Serial No. 58,611, filed on even date herewith and entitled "Water-Soluble Aminoalkyl Carbamates and Their Preparation," now Patent No. 2,556,146.

Examples of compounds utilized as quaternizing agents are ethylene chlorhydrin, ethylene bromhydrin, glycol chlorhydrin, and the like.

The products as noted may be used as surface active agents, as pharmaceuticals, and as biocides.

The invention is further explained by the following examples, but it is to be understood that the invention is not restricted thereto.

*Example 1.—Tris-(β-hydroxyethyl)-2-octadecylcarbamyl-oxy ethyl ammonium chloride*

In a 100 ml. flask equipped with a reflux condenser was placed 22.2 grams (0.05 mol) of 2-(di-β-hydroxyethylamino) ethyl ester of octadecyl carbamic acid and 24 grams (0.3 mol) of ethylene chlorohydrin. The mixture was refluxed (130° C. liquid temperature) for five days and then the excess chlorohydrin was removed by vacuum distillation. The product was a tan waxy solid, soluble in water. The aqueous solution gave a good test for halide ion with silver nitrate in dilute nitric acid. The yield was 26 grams, or 100% of the theoretical.

A test performed by C. Lawsberg on January 27, 1947, using Indanthrone Blue Green FFBN Dbl paste on cotton showed the product to be a good leveling agent.

*Example 2.—β-Hydroxyethyl-2-(octadecylcarbamyl-oxy) ethyl morpholinium chloride*

In a 50 ml. flask equipped with a reflux condenser was placed 11.1 grams (.025 mol) of 2-(4-morpholinyl) ethyl ester of octadecyl carbamic acid and 12 grams (.15 mol) of ethylene chlorohydrin. The mixture was refluxed for one day, the excess chlorohydrin was removed by vacuum distillation and the product was cooled. Recrystallization from acetone gave 5.5 grams (42.6% of the theoretical 12.9 grams) of colorless, very hygroscopic crystals. The product contained ionic chlorine.

*Example 3.—2-(phenylcarbamyl-oxy)-ethyl-tris-β-(hydroxyethyl) ammonium chloride*

In a 200 ml. 3-necked flask was placed 26.8 grams (.1 mol) of di-(β-hydroxyethyl)-2-phenylcarbamyl-oxy ethylamine and 40 grams (.5 mol) of ethylene chlorohydrin. The solution was refluxed for four days and then the excess chlorohydrin was removed by vacuum distillation. The orange-red viscous residue weighed 35 grams. The theoretical yield is 34.8 grams, showing that the product still contained a small amount of ethylene chlorohydrin. The product was very hygroscopic and contained ionic chlorine.

*Example 4*

The procedure is the same as in Example 1 excepting that the 2-(di-β-hydroxyethylamino)-ethyl ester of octadecyl carbamic acid is replaced by the di-ester resulting from the the addition of octadecyl isocyanate to the addition product piperazine and 25 mols of ethylene oxide.

UTILIZATION OF THE COMPOUNDS AS FUNGICIDES

*Example 5*

The product of Example 1 was employed as a fungicide while following the "slide germination technique" described by S. E. A. McCallan et al., Contribution of the Boyce Thompson Institute, 4, 233 (1932); 9, 249 (1938); 10, 329 (1939); 12, 49 (1941); 12, 431 (1942).

The results of this test indicate a 12% germination at 0.0001%.

*Example 6*

The product of Example 2 was employed as a fungicide according to the technique of Example 5. The results of this test showed <1% germination at .0001%.

*Example 7*

The product of Example 1 was utilized as a mothproofing agent while following the following procedure: Five carpet beetle larvae were maintained in a Petri dish containing a 1½ inch square patch of wool broadcloth containing about 1% by weight of the compound of Example 1. After 30 days the appearance of the cloth was noted. If there be no visible damage, mothproofing action is indicated. The result of the test showed all of the larvae to be alive after 30 days but no visible damage to the cloth.

Various modifications of the invention will occur to persons skilled in this art, and I therefore do not intend to be limited in the patent granted except as necessitated by the appended claims.

I claim:

1. Compounds selected from the class consisting of those of the following formulae:

$$\begin{array}{c}R''\\ \diagdown\\ R-N-(CH_2CH_2O)_n-C-NHR'\\ \diagup\, |\qquad\qquad\quad \|\\ R'\ X\qquad\qquad\qquad O\end{array}$$

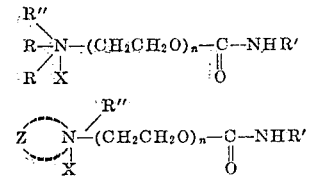

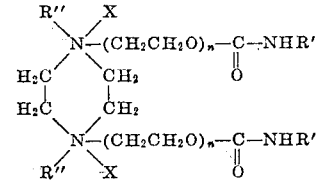

wherein R is selected from the class consisting of β-hydroxyalkyl and hydroxy polyalkyloxyalkyl, R' is selected from the class consisting of alkyl, phenyl and naphthyl, n is a whole number, Z represents the atoms necessary to complete a nitrogenous heterocyclic ring system selected from the class consisting of tetrahydroquinoline, morpholine, piperazine and pyrrolidine, R'' is selected from the class consisting of β-hydroxyalkyl, hydroxyalkoxyalkyl and hydroxypolyalkyloxyalkyl, and X is an anion.

2. Tris-(β-hydroxyethyl)-2-octadecylcarbamyl-oxy ethyl ammonium chloride.

3. β-Hydroxyethyl-2-(octadecylcarbamyl-oxy)-ethyl morpholinium chloride.

4. 2-(phenylcarbamyl-oxy)-ethyl-tris-β-(hydroxyethyl)-ammonium chloride.

ROBERT T. OLSEN.

REFERENCES CITED

The following references are of record in the file of this patent:

UNITED STATES PATENTS

| Number | Name | Date |
|---|---|---|
| 1,970,578 | Schoeller | Aug. 21, 1934 |
| 2,033,740 | Rider | Mar. 10, 1936 |
| 2,075,230 | Schatz | Mar. 30, 1937 |
| 2,083,181 | Zwiefel et al. | June 8, 1937 |
| 2,087,506 | De Groote | July 20, 1937 |
| 2,089,985 | Ruigh | Aug. 17, 1937 |
| 2,129,264 | Baxter et al. | Sept. 6, 1938 |
| 2,137,042 | Christiansen | Nov. 15, 1938 |
| 2,161,615 | Dietrich | June 6, 1939 |
| 2,187,823 | Ulrich et al. | Jan. 23, 1940 |
| 2,293,494 | De Groote | Aug. 18, 1942 |
| 2,374,367 | Major et al. | Apr. 24, 1945 |
| 2,409,001 | Shelton | Oct. 8, 1946 |
| 2,432,049 | Swan | Dec. 2, 1947 |

OTHER REFERENCES

Gardner et al.: Jour. Amer. Chem. Soc., vol. 55 (1933), pp. 3823–3824.

Cheney et al.: Jour. Amer. Chem. Soc., vol. 64 (1942), pp. 970–973.

Kitchen et al.: Jour. Org. Chem., vol. 8 (1943), pp. 338–341.